United States Patent
Brunet et al.

(10) Patent No.: US 9,569,016 B2
(45) Date of Patent: Feb. 14, 2017

(54) LOW-POWER AND LOW-FREQUENCY DATA TRANSMISSION FOR STYLUS

(71) Applicant: Atmel Corporation, San Jose, CA (US)

(72) Inventors: Samuel Brunet, Cowes (GB); Richard Collins, Southampton (GB); Bernard Hermes, Southampton (GB); Luben Hristov, Sofia (BG)

(73) Assignee: Atmel Corporation, San Jose, CA (US)

( * ) Notice: Subject to any disclaimer, the term of this patent is extended or adjusted under 35 U.S.C. 154(b) by 127 days.

(21) Appl. No.: 14/461,956

(22) Filed: Aug. 18, 2014

(65) Prior Publication Data

US 2016/0048227 A1   Feb. 18, 2016

(51) Int. Cl.
G06F 3/0354 (2013.01)
G06F 3/041 (2006.01)
G06F 3/044 (2006.01)

(52) U.S. Cl.
CPC ........... *G06F 3/03545* (2013.01); *G06F 3/044* (2013.01); *G06F 3/0416* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,723,824 B2 | 5/2014 | Myers | |
| 2008/0309635 A1 | 12/2008 | Matsuo | |
| 2009/0315854 A1 | 12/2009 | Matsuo | |
| 2012/0105362 A1* | 5/2012 | Kremin | G06F 3/03545 345/174 |
| 2012/0154340 A1* | 6/2012 | Vuppu | G06F 3/044 345/179 |
| 2012/0242588 A1 | 9/2012 | Myers | |

(Continued)

FOREIGN PATENT DOCUMENTS

WO   WO 2012/129247 A2   9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Antonio Xavier
(74) *Attorney, Agent, or Firm* — Baker Botts L.L.P.

(57) ABSTRACT

In one embodiment, a method includes initiating an acquisition of a first signal from an electrode of a touch sensor according to an acquisition frequency of the touch sensor. The method also includes reversing, with a controller, a polarity of the first signal to produce a second signal. The method also includes storing a first modulated signal at an end of the acquisition of the first signal, where the first modulated signal includes the second signal as modulated by one or more third-party signals during the acquisition of the first signal.

16 Claims, 7 Drawing Sheets

(56) References Cited

U.S. PATENT DOCUMENTS

| | | | |
|---|---|---|---|
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0057491 A1* | 3/2013 | Chu | G06F 3/0416 345/173 |
| 2013/0057503 A1* | 3/2013 | Hristov | G06F 3/044 345/174 |
| 2013/0076612 A1 | 3/2013 | Myers | |
| 2013/0106722 A1* | 5/2013 | Shahparnia | G06F 3/03545 345/173 |
| 2013/0106760 A1* | 5/2013 | Pedersen | G06F 3/03545 345/174 |
| 2013/0106797 A1* | 5/2013 | Pant | G06F 3/0383 345/179 |
| 2013/0106912 A1* | 5/2013 | Um | G09G 5/00 345/649 |
| 2013/0207938 A1* | 8/2013 | Ryshtun | G06F 3/0416 345/179 |
| 2013/0207939 A1* | 8/2013 | Kremin | G06F 3/0383 345/179 |
| 2013/0307813 A1* | 11/2013 | Hanssen | G06F 3/044 345/174 |
| 2014/0028577 A1* | 1/2014 | Krah | G06F 3/0416 345/173 |
| 2014/0049478 A1* | 2/2014 | Brunet | G06F 3/0416 345/173 |
| 2014/0152582 A1* | 6/2014 | Agarwal | G06F 3/0418 345/173 |
| 2014/0210491 A1* | 7/2014 | Jonsson | G01R 27/2605 324/661 |
| 2014/0347317 A1* | 11/2014 | Tanaka | G06F 3/044 345/174 |

* cited by examiner

LOW-POWER AND LOW-FREQUENCY DATA TRANSMISSION FOR STYLUS

TECHNICAL FIELD

This disclosure generally relates to touch sensors and styluses.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
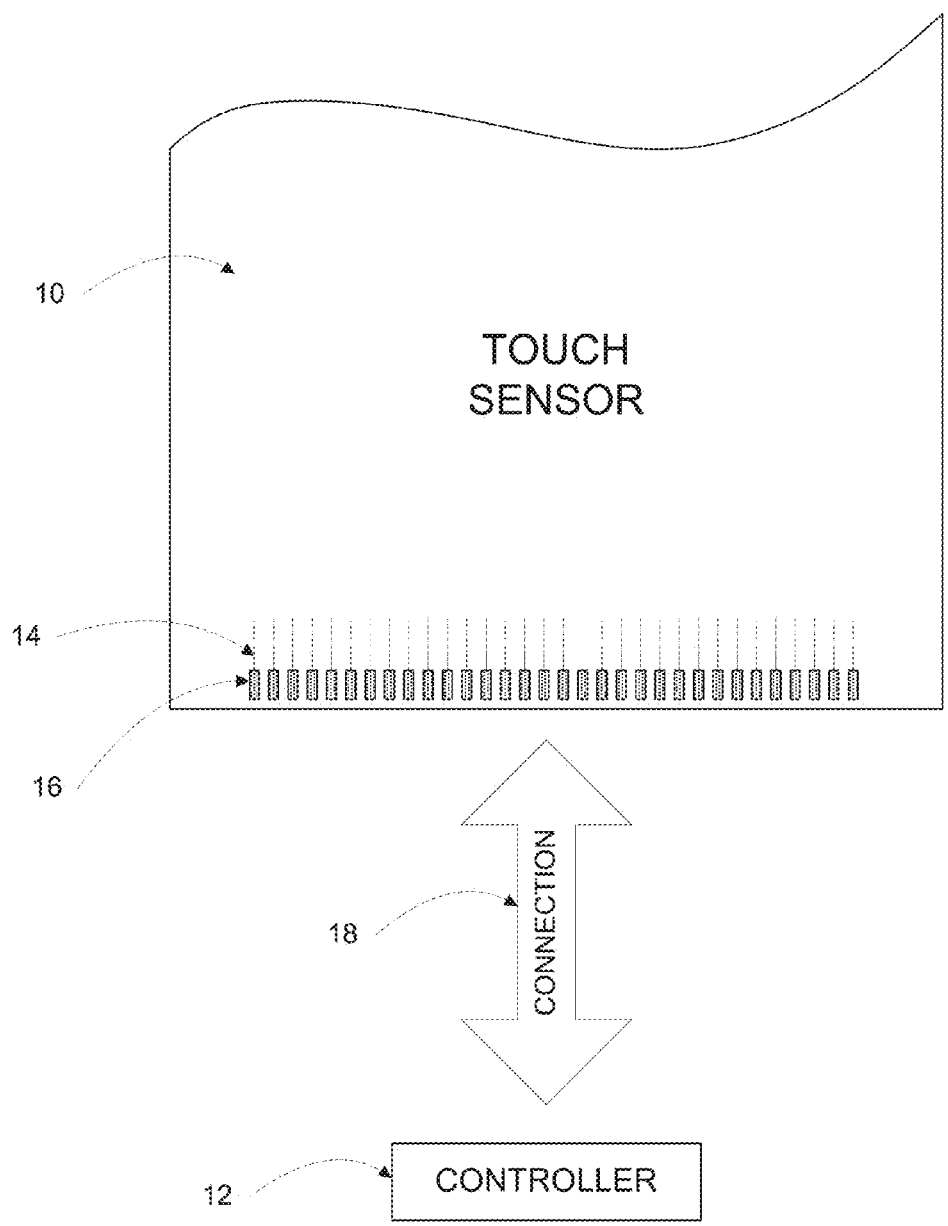
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (ELM), such as for example copper, silver, carbon, or a copper-, silver-, or carbon-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. As yet another example, one or more portions of the conductive material may be carbon or carbon-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive electrode line running horizontally or vertically or in any suitable orientation. Similarly, one or more sense electrodes may together form a sense electrode line running horizontally or vertically or in any suitable orientation. Additionally, one or more ground electrodes may together form a ground electrode line running horizontally or vertically or in any suitable orientation. In particular embodiments, drive electrode lines may run substantially perpendicular to sense electrode lines. In particular embodiments, drive electrode lines may run substantially parallel to sense electrode lines. Herein, reference to a drive electrode line may encompass one or more drive electrodes making up the drive electrode line, and vice versa, where appropriate. Similarly, reference to a sense electrode line may encompass one or more sense electrodes making up the sense electrode line, and vice versa, where appropriate. Additionally, reference to a ground electrode line may encompass one or more ground electrodes making up the ground electrode line, and vice versa, where appropriate. In particular embodiments, any electrode may be configured as a drive, sense, or ground electrode and the configuration of any electrode may be changed during operation of touch sensor 10. In particular embodiments, configuration of electrodes may be controlled by touch-sensor controller 12.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

In particular embodiments, touch sensor 10 may determine the position of an object (such as a stylus or a user's finger or hand) that makes physical contact with a touch-sensitive area of touch sensor 10. In addition or as an alternative, in particular embodiments, touch sensor 10 may determine the position of an object that comes within proximity of touch sensor 10 without necessarily contacting touch sensor 10. In particular embodiments, an object may come within proximity of touch sensor 10 when it is located some distance above a surface of touch sensor 10; when it hovers in a particular position above a surface of touch sensor 10; when it makes a motion (such as for example a swiping motion or an air gesture) above a surface of touch sensor 10; or any suitable combination of the above. In particular embodiments, determining the position of an object that comes within proximity of touch sensor 10 without making physical contact may be referred to as determining the proximity of an object. In particular embodiments, determining the proximity of an object may comprise determining the position of an object's projection onto touch sensor 10 when the object is located some distance above a plane of touch sensor 10. The projection of an object onto touch sensor 10 may be made along an axis that is substantially orthogonal to a plane of touch sensor 10. In particular embodiments, the position of an object's projection onto touch sensor 10 may be referred to as the position or the location of an object. As an example and not by way of limitation, touch sensor 10 may determine the position of an object when the object is located above the surface of touch sensor 10 and within a distance of approximately 20 mm of the surface of touch sensor 10. Although this disclosure describes or illustrates particular touch sensors 10 that may determine a position of physical contact of an object, a proximity of an object, or a combination of the two, this disclosure contemplates any suitable touch sensor 10 suitably configured to determine a position of physical contact of an object, a proximity of an object, or any suitable combination of one or more of the above.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g., at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. As yet another example, the conductive material of tracks 14 may be carbon or carbon-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground electrode lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACE). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector such as a zero insertion force wire-to-board connector); in this embodiment, connection 18 may not need to include an FPC. This disclosure contemplates any suitable connection 18 between touch-sensor controller 12 and touch sensor 10.

Figure 2:
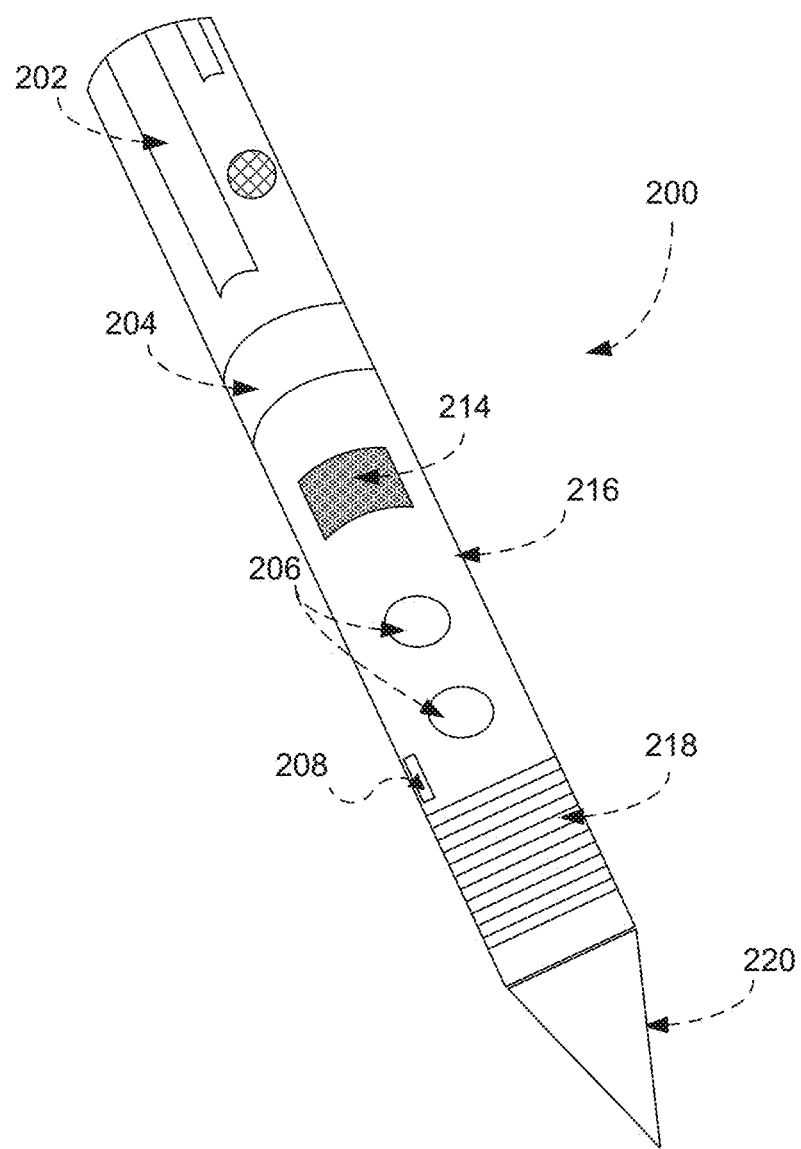
FIG. 2 illustrates an example active stylus exterior.

FIG. 2 illustrates an example exterior of active stylus 200, which may be used in conjunction with touch sensor 10 of FIG. 1. The active stylus 200 may be powered by an internal or external power source. Active stylus 200 may provide touch or proximity inputs to a touch sensor, such as touch sensor 10 of FIG. 1. As an example of FIG. 2, active stylus 200 may include external components such as buttons 206, slider 202, and slider 204 that are integrated with outer body 216. Herein, reference to an active stylus may encompass one or more of a button, one or more of a slider, or one or more of a button and one or more of a slider, where appropriate. Such external components may provide for interactions between active stylus 200 and example device 42 of FIG. 4, between active stylus 200 and a user, or between device 42 and the user. As an example and not by way of limitation, interactions may include communication between active stylus 200 and device 42, enabling or altering one or more functionalities of active stylus 200 or device 42, or providing feedback to or accepting input from one or more users. Furthermore, outer body 216 may have any suitable dimensions and made of any suitable material or combination of materials. As an example and not by way of limitation, outer body 216 may be made of a conductive material in order to achieve galvanic or capacitive coupling to human body. In particular embodiments, a thin dielectric layer that does not substantially affect the capacitive coupling may be applied on the conductive material. Device 42 may be any suitable device such as a desktop computer, laptop computer, tablet computer, personal digital assistant (PDA), smartphone, satellite navigation device, portable media player, portable game console, kiosk computer, point-of-sale device, or other suitable device. Although this disclosure illustrates and describes particular components configured to provide particular interactions, this disclosure contemplates any suitable components configured to provide any suitable interactions. As an example and not by way of limitation, external components (such as for example buttons 206 or slider 202) of active stylus 200 may interact with one or more internal components of active stylus 200. In particular embodiments, the external components may transmit tip pressure information from active stylus 200 to device 42. In other particular embodiments, the external components may transmit general information such as for example button (for example, buttons 206) status (for example, pushed or not pushed) to device 42. As another example and not by way of limitation, the external components may provide for one or more interactions with one or more devices 42 or other active styluses 200.

As described above, actuating one or more particular external components may initiate an interaction between active stylus 200 and device 42, between active stylus 200 and the user, or between device 42 and the user. Particular external components such as buttons 206 and sliders 202-204 may be mechanical or capacitive. The particular external components may function as rollers, trackballs, or wheels. As an example and not by way of limitation, slider 202 may function as a vertical slider that is aligned along a latitudinal axis of active stylus 200. As another example and not by way of limitation, slider 204 may function as a wheel that is aligned along a circumference of active stylus 200. Buttons 206 may be implemented using one or more low-profile mechanical single-pole single-throw (SPST) on/off switches. Capacitive sliders 202-204 and buttons 206 may even be implemented using one or more touch-sensitive areas. The touch-sensitive areas may have any suitable shapes, dimensions, or locations. Furthermore, the touch-sensitive areas may be made from any suitable materials. As an example and not by way of limitation, each touch-sensitive area may be implemented using flexible mesh of electrically-conductive materials. As another example and not by way of limitation, each touch-sensitive area may be implemented using an FPC.

Active stylus 200 may include grooves 218 on its outer body 216. Grooves 218 may have any suitable dimensions. Grooves 218 may be located at any suitable area on outer body 216 of active stylus 200. Grooves 218 may enhance a user's grip on outer body 216 of active stylus 200. In the example of FIG. 2, surface 214 may be modified. Accordingly, modified surface 214 of active stylus 200 may possess properties that are different from rest of outer body 216. As an example and not by way of limitation, modified surface 214 may have a different texture, temperature, or electromagnetic characteristic from the rest of outer body 216. Modified surface 214 may form one or more components on outer body 216. Modified surface 214 may also be capable of dynamically altering one or more properties. Furthermore, the user may interact with modified surface 214 to provide a particular interaction. As an example and not by way of limitation, dragging a finger across modified surface 214 may initiate a data transfer between active stylus 200 and device 42.

One or more components of active stylus 200 may be configured to communicate data between active stylus 200 and device 42. As an example of FIG. 2, active stylus 200 may include tip (or nib) 220. Tip 220 may include one or more conductive rings to communicate data between active stylus 200 and one or more other devices 42 or other active styluses. In particular embodiments, the conductive rings may reside close to the tip in order to reduce attenuation loss of any electrical signals as injected from active stylus 200 to device 42. In other particular embodiments, the one or more conductive rings of active stylus 200 may reside on its outer body 216 or any other suitable part of active stylus 200. In yet other particular embodiments, tip 220 may include pressure sensor that provides or communicates pressure information (for example, an amount of pressure being exerted by active stylus 200 through tip 220) between active stylus 200 and device 42 or other active styluses 200. Tip 220 may be made of any suitable material (for example an electrically conductive material) and possess any suitable dimension (for example a diameter of 1 mm or less at its terminal end). In the example of FIG. 2, active stylus 200 may include port 208 at any suitable location on outer body 216. Port 208 may be configured to transfer signals or information between active stylus 200 and one or more devices 42 via, for example, wired coupling. Port 208 may also transfer signals or information by any suitable low-powered technology, such as RS-232. Although this disclosure describes and illustrates particular stylus comprising particular configuration of particular components having particular locations, dimensions, compositions, and functionalities, this disclosure contemplates any suitable stylus comprising any suitable configuration of any suitable components having any particular locations, dimensions, compositions, and functionalities.

Figure 3:
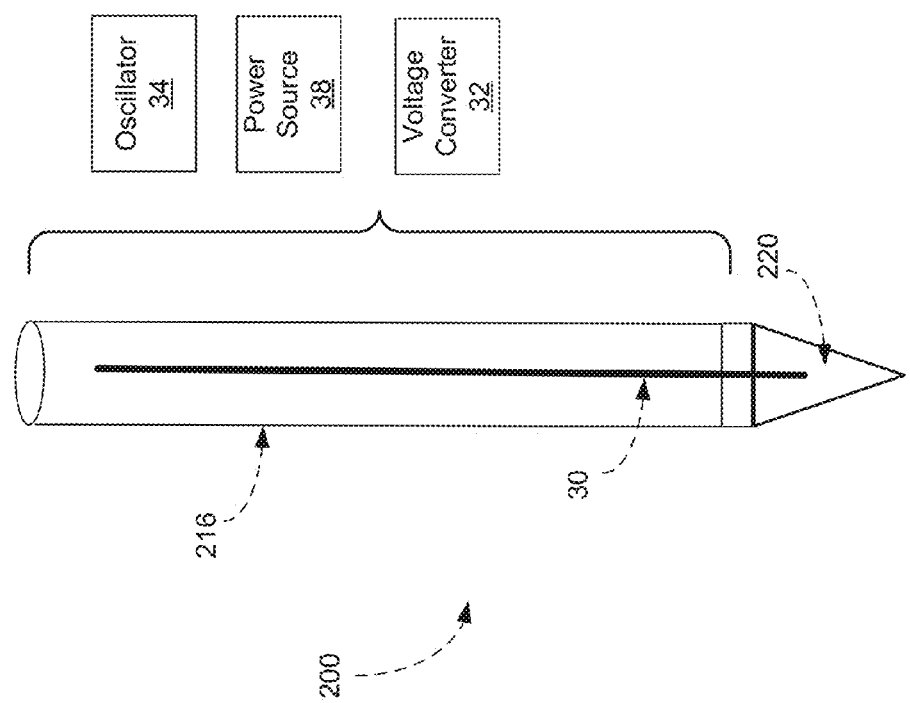
FIG. 3 illustrates an example active stylus interior.

FIG. 3 illustrates example internal components of active stylus 200. Active stylus 200 may include oscillator 34, power source 38, and voltage converter 32. Herein, reference to an active stylus may comprise one or more of an oscillator, one or more of a power source, and one or more of a voltage converter where appropriate. Accordingly, oscillator 34, power source 38, and voltage converter 32 may form internal components of active stylus 200. In particular embodiments, one or more of the internal components may be configured to provide an interaction between active stylus 200 and example device 42 of FIG. 4, between active stylus 200 and a user, or between device 42 and the user. In other particular embodiments, one or more of the internal components, in conjunction with one or more of the external components as described above, may be configured to provide an interaction between active stylus 200 and device 42, active stylus 200 and the user, or between device 42 and the user. As an example and not by way of limitation, interactions may include communication between active stylus 200 and device 42, enabling (or altering) functionality of active stylus 200 (or device 42), or providing feedback to (or accepting input from) one or more users. As another example and not by way of limitation, when one of buttons 206 is pressed, active stylus 200 may communicate data to device 42 by injecting a suitable low-power and low-frequency electrical signal to device 42 via tip 220.

Active stylus 200 may inject electrical signals to one or more conductive rings of tip 200 via center shaft 30. In particular embodiments, active stylus 200 may be configured to transmit one or more electrical signals detectable by electrodes of touch sensor 10 of device 42. As an example and not by way of limitation, active stylus 200 may include voltage converter 32. When one of buttons 206 is pressed, voltage converter 32 may generate a high-voltage electrical power source from the low-voltage output of power source 38. In particular embodiments, the high-voltage electrical power source may be 18V to 24V. This high-voltage electrical power source may be used to power oscillator 34. Oscillator 34 may toggle the voltage potential of tip 200 between GND voltage and one or more pre-determined voltage levels (for example the high-voltage electrical power source as generated by voltage converter 32). As an example and not by way of (imitation, an output of oscillator 34 may include an oscillating sinusoid wave (or any other suitable smooth wave) having a frequency of 2 kHz at 15V, a maximum peak-to-peak output voltage swing of 15V, low-power consumption (for example less than 30 µA at 20V), and low distortion. As another example and by way of limitation, oscillator 34 may be a modified Wien bridge oscillator configured to output a 2 kHz sinusoid electrical wave with a peak-to-peak output voltage swing of 15V and a low level of distortion. As yet another example and not by way of limitation, oscillator 34 may output an oscillating sinusoid wave (or any other suitable smooth wave) having a frequency that is substantially between 14 kHz and 16 kHz, and having a maximum peak-to-peak output voltage swing of substantially between 25V and 32V. In particular embodiments, each button of buttons 206 may configure oscillator 34 to generate a distinct sinusoid wave of a particular frequency. As an example and not by way of limitation, a first button may configure oscillator 34 to generate a 1.5 kHz oscillating sinusoid wave while a second button may configure oscillator 34 to generate a 2 kHz oscillating sinusoid wave. In other particular embodiments, oscillator 34 and its associated components in active stylus 200 may be designed such that generation of any sinusoid wave (or any suitable smooth wave) may immediately be halted following the release of button 206. Furthermore, by modulating the frequency of the sinusoid wave, different data (for example, different tip pressure information) may be transmitted by active stylus 200 to device 42. Although this disclosure describes a third-party signal as particular sinusoid signal, the disclosure contemplates the third-party signal as any suitable smooth wave. As an example and not by way of limitation, the third-party signal may be any smooth wave whose instantaneous rate of change of voltage over time is substantially within suitable limits.

Power source 38 may be any suitable source of stored energy including but not limited to electrical and chemical-energy sources. Such power source may be suitable for operating active stylus 200 without being replaced or recharged for lifetime of active stylus 200. Power source 38 may be a plurality of super capacitors, an alkaline battery or a rechargeable battery, or any suitable low-capacity and long-life battery. In particular embodiments, power source 38 may be a 3V battery. When any one of buttons 206 is pressed (a.k.a. active stylus 200 in active-mode), the 3V battery may consume less than 300 µA of current. When none of buttons 206 are pressed, the 3V battery may consume less than 0.3 µA in order to maintain at least voltage converter 32 in idle mode. In other particular embodiments, active stylus 200 may be designed such that the 3V battery consumes substantially negligible current when no buttons 206 are pressed. As an example and not by way of limitation, the rechargeable battery may be a lithium-ion battery, a nickel-metal-hydride battery. The lithium-ion battery may last for a substantially longer period of time (for example 5-10 years) and may be used to power active stylus 200 when one of buttons 206 is pressed. Power source 38 may also be charged by energy from a user or device 42. As an example and not by way of limitation, power source 38 may be charged by motion induced on active stylus 200. Power source 38 of active stylus 200 may also receive power from device 42 or any other suitable external power source. As an example and not by way of limitation, energy may be inductively transferred from device 42 and a power source of the device or any other suitable external power source (for example a wireless power transmitter). As another example and not by way of limitation, power source 38 may be one or more solar cells. Power source 38 may also receive its power by a wired connection through an applicable port coupled to a suitable external power supply. Although this disclosure describes and illustrates particular stylus with particular components having particular implementations, this disclosure contemplates any suitable stylus with any suitable components in any suitable manner having the particular implementations.

Figure 4:
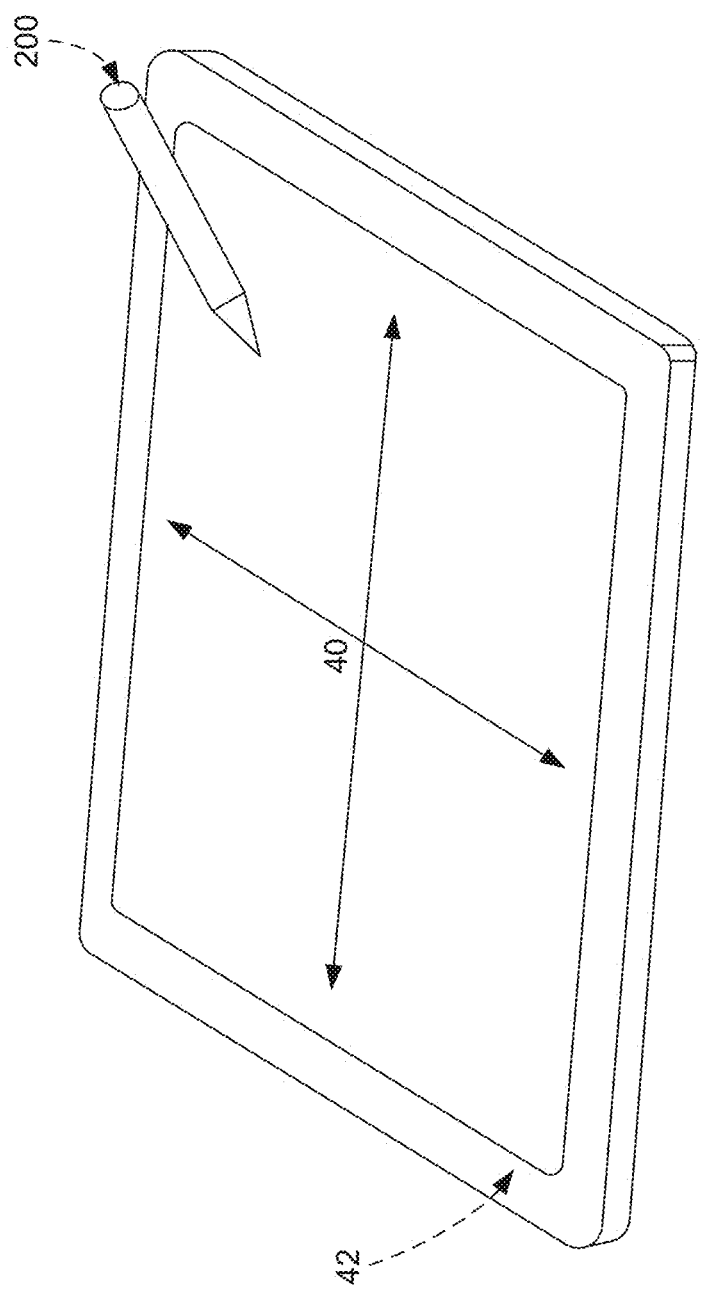
FIG. 4 illustrates an example active stylus with an example device.

FIG. 4 illustrates active stylus 200 with device 42. Device 42 may be a touch screen. Device 42 may have a display (not shown) and a touch sensor 10 with a touch-sensitive area 40. The display may be a liquid crystal display (LCD), a light-emitting diode (LED) display, a LED-backlight LCD, or other suitable display. Furthermore, the display may be visible through a cover panel and one or more substrates (with the drive and sense electrodes that are disposed on the one or more substrates) of device 42. Although this disclosure describes and illustrates particular display with particular touch sensor, this disclosure contemplates any suitable display with any suitable touch sensor.

Device 42 may include electronics that provide one or more functionalities. As an example and not by way of limitation, device 42 may include circuitry or any other suitable electronics for wireless communication to or from device 42, executing programs on device 42, generating graphical or other user interfaces (UIs) for device 42 to display to a user, managing power to device 42 from a battery or other suitable power sources, recording multimedia content, any other suitable functionality, or any suitable combination of these. Although this disclosure describes and illustrates particular electronics of particular touch-sensing device providing particular functionalities, this disclosure contemplates any suitable electronics of any suitable touch-sensing device providing any suitable functionalities.

Active stylus 200 and device 42 may be synchronized prior to communication of data between active stylus 200 and device 42. As an example and not by way of limitation, active stylus 200 may be synchronized to device 42 through a pre-determined bit sequence transmitted by touch sensor 10 of device 42. As another example and not by way of limitation, active stylus 200 may be synchronized to device 42 by processing a drive signal transmitted by one or more electrodes of touch sensor 10 of device 42. As yet another example and not by way of limitation, active stylus 200 may be synchronized to device 42 through a pre-determined bit sequence transmitted by active stylus 200. Active stylus 200 may also interact or communicate with device 42 when it is brought in contact with or in proximity to touch-sensitive area 40 of touch sensor 10. Such interaction between active stylus 200 and device 42 may be capacitive, inductive, or conductive. When active stylus 200 is bought in contact with or in the proximity of touch-sensitive area 40 of touch sensor 10, signals generated by active stylus 200 may influence capacitive nodes within touch-sensitive area 40. Although this disclosure describes and illustrates particular interactions between particular stylus and particular touch-sensing device via particular means, this disclosure contemplates any suitable interactions between any suitable stylus and any suitable touch-sensing device via any suitable means.

Interaction between active stylus 200 and device 42 may occur when active stylus 200 is contacting or in proximity to device 42. As an example and not by way of limitation, a user may perform a gesture or sequence of gestures, such as pressing one or more buttons 206, whilst active stylus 200 is hovering above touch-sensitive area 40 of device 42. Based on the one or more buttons 206 being pressed, active stylus 200 may interact with device 42 to initiate a pre-determined function. The pre-determined function may be authenticating a user associated with active stylus 200 or device 42. The pre-determined function may even initiate a particular job function of device 42. Although this disclosure describes and illustrates particular interactions between particular stylus and particular touch-sensing device, this disclosure contemplates any suitable interactions in any suitable manner.

Figure 5:
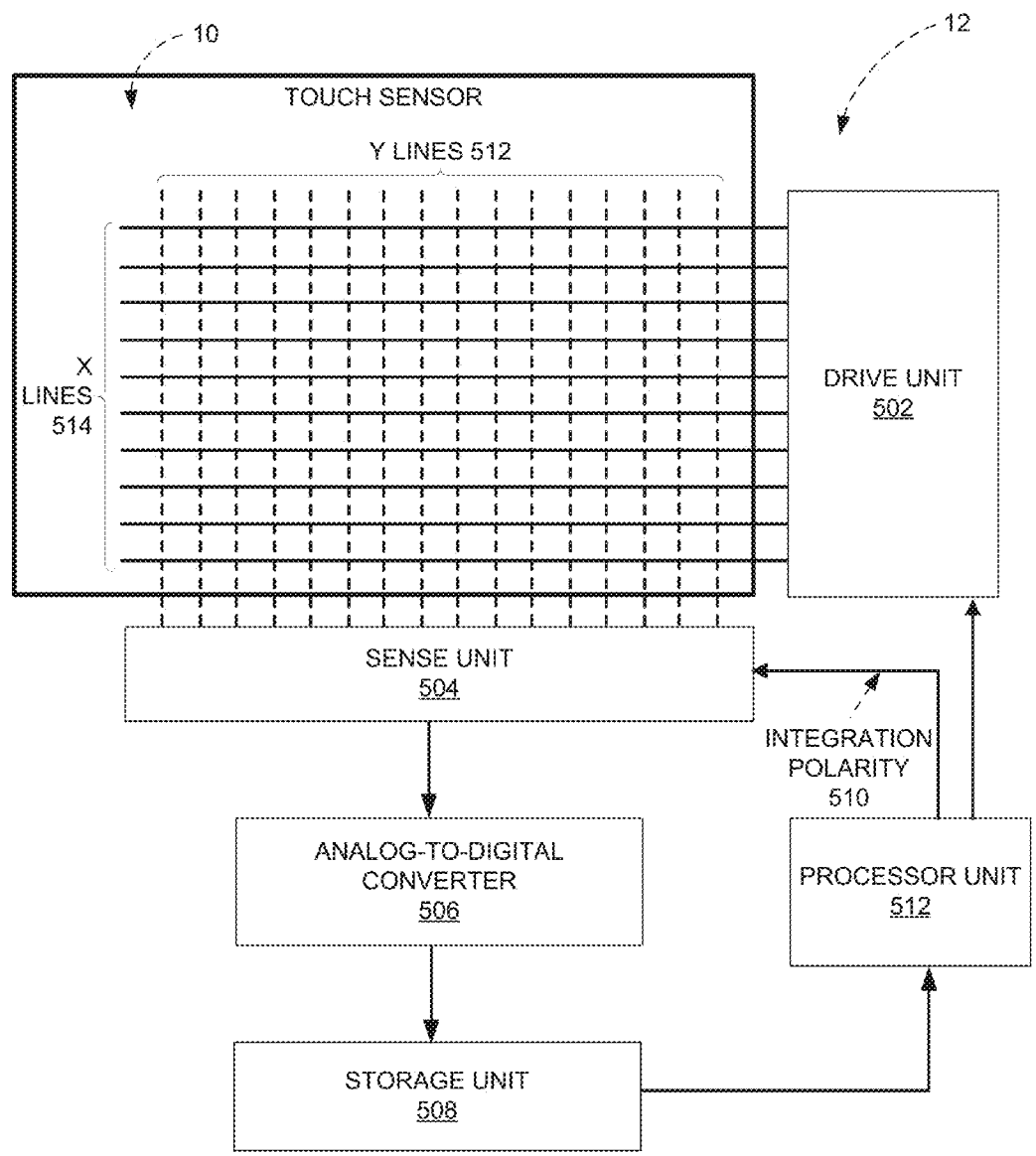
FIG. 5 illustrates an example touch-sensor controller configured for mutual-capacitance measurement.

FIG. 5 illustrates touch-sensor controller 12 of device 42 configured for mutual-capacitance measurement. Touch sensor controller 12 may include touch sensor 10, drive unit 502, sense unit 504, analog-to-digital converter (ADC) 506, storage unit 508, and processor unit 512. Herein, reference to touch-sensor controller may comprise one or more of a touch sensor, one or more of a drive unit, one or more of a sense unit, one or more of an ADC, one or more of a storage unit, and one or more of a processor unit where appropriate. Accordingly, touch sensor 10, drive unit 502, sense unit 504, ADC 506, storage unit 508, and processor unit 512 may form internal components of touch-sensor controller 12. Touch sensor 10 may include an array of drive and sense electrodes (or an array of electrodes of a single type) as described above. Furthermore, touch sensor 10 may include a plurality of X lines 514 and a plurality of Y lines 512. X Lines 514 form the drive electrode lines of touch sensor 10 as described above. Herein, reference to X lines 514 may encompass drive electrode lines, and vice versa, where appropriate. Similarly, Y lines 512 form the corresponding sense electrode lines of touch sensor 10 as described above. Herein, reference to Y lines 512 may encompass sense electrode lines, and vice versa, where appropriate. In particular embodiments, one or more of the internal components may be configured to provide an interaction between example device 42 and active stylus 200 or between device 42 and user. As an example and not by way of limitation, interactions may include communication between device 42 and active stylus 200, enabling functionality of device 42 (or active stylus 200), or providing feedback to (or accepting input from) one or more users. As another example and not by way of limitation, processor unit 512 may be configured to measure signals produced by Y lines 512 to extract any data as embedded within the signals. In particular embodiments, such signals may be sense signals that are initiated by drive signals being applied to the corresponding X lines 514 by drive unit 502. Such drive signals generate electric field extending from the X lines 514 to the corresponding Y lines 512. Accordingly, the electric field may produce corresponding sense signals in the Y lines 512. As an example and not by way of limitation, when drive unit 502 applies a rising voltage signal (for example, a voltage signal that transitions from a logic-low voltage to a logic-high voltage) to one of X lines 514, a positive spike of sense signal may be generated on a corresponding sense electrode line of Y lines 512. As another example and not by way of limitation, when drive unit 502 applies a falling voltage signal (for example, a voltage signal that transitions from a logic-high voltage to a logic-low voltage) to one of X lines 514, a negative spike of sense signal may be generated on a corresponding sense electrode line of Y lines 512. Although this disclosure describes and illustrates particular components of particular touch-sensor controller for performing capacitance measurements in particular manner, this disclosure contemplates any combination of one or more suitable components of any suitable touch-sensor controller for performing capacitance measurements in any suitable manner. As an example and not by way of limitation, touch-sensor controller 12 and touch sensor 10 may implement self-capacitance measurement, as described above.

In particular embodiments, signals produced by Y lines 512 may be initiated by a third-party sinusoid electrical signal. The third-party sinusoid electrical signals may oscillate at frequency that is substantially lower than the acquisition frequency utilized by sense unit 504 to acquire signals from Y lines 512. As an example and not by way of limitation, an acquisition frequency of sense unit 504 may substantially be between 100 kHz and 120 kHz. As an example and not by way of limitation, the third-party sinusoid electrical signal may be power-line noise of low-frequency (for example, 50 Hz to 60 Hz) and high-voltage for example, above 200V). As another example and not by way of limitation, the third-party sinusoid electrical signal may be a low-frequency electrical oscillating signal as injected by active stylus 200 of FIGS. 2-3, as described above. In particular embodiments, the low-frequency electrical oscillating signal may operate at a frequency that is substantially higher than frequency of the power-line noise (as described above) and substantially lower than acquisition frequency of sense unit 504. As an example and not by way of limitation, the low-frequency electrical oscillating signal may operate at a frequency that is substantially equivalent to 16 kHz while the acquisition frequency of sense unit 504 may substantially be between 100 kHz and 120 kHz. As another example and not by way of limitation, the acquisition frequency of sense unit 504 may substantially be five to eight times a frequency of the low-frequency electrical oscillating signal. When voltage amplitude of the third-party sinusoid electrical signal exceeds over 200V, the charge injected by the third-party sinusoid electrical signal into touch sensor 10 may envelop the real sense signals produced by Y lines 512. As such, the accuracy of measurement by touch-sensor controller 12 may be affected. Even when voltage amplitude of the third-party sinusoid electrical signal is relatively high (for example, 20V to 40V), the charge injected into touch sensor 10 may be substantially higher than any normal environmental noise captured by touch sensor 10. In other words, the third-party sinusoid electrical signal may have a substantial signal footprint, even in the presence of environmental noise. In contrast, when frequency of the third-party sinusoid electrical signal is substantially lower than the acquisition frequency of sense unit 504, the third-party sinusoid electrical signal may not substantially affect the measurement accuracy and performance of the touch-sensor controller 12. As an example and not by way of limitation, linearity and position jitter as associated with touch and proximity measurements by touch-sensor controller 12 remain substantially unchanged. As such, touch-sensor controller 12 may continue to detect and measure the proximity of any objects substantially close to touch sensor 10, even in the presence of one or more high-voltage and low-frequency third-party sinusoid electrical signals. However, the third-party sinusoid electrical signals may further modulate signals on Y lines 512 as the signals are being modulated by sense unit 504. In particular embodiments, the extent of modulation may depend at least on the amount of charge being transferred from the power-line and/or active stylus 200, the time at which the signals on Y lines 512 are being acquired by sense unit 504, and the duration of acquisition. Although this disclosure describes a third-party signal as particular sinusoid signal, the disclosure contemplates the third-party signal as any suitable smooth wave. As an example and not by way of limitation, the third-party signal may be any smooth wave whose instantaneous rate of change of voltage over time is substantially within suitable limits.

In particular embodiments, sense unit 504 may be configured to reverse the polarity of sense signal as measured by sense unit 504. As an example of FIG. 5 and not by way of limitation, sense unit 504 may receive an indication from processor unit 512 via integration polarity 510 whether to reverse polarity of a sense signal as acquired by sense unit 504 at a time instance. As an example of FIG. 6 and not by way of limitation, sense unit 504 acquires sense signal S at time instance $t_{00}$ when integration polarity 510 is positive. As another example of FIG. 6 and not by way of limitation, sense unit 504 acquires sense signal –S at time instance $t_{10}$ when integration polarity 510 is negative. Although this disclosure describes and illustrates particular touch-sensor controller measuring particular sense signals of particular touch sensor by utilizing particular components in a particular manner, this disclosure contemplates the touch-sensor controller measuring any suitable sense signals of the touch sensor by utilizing one or more of any suitable component in any suitable manner.

In particular embodiments, touch-sensor controller 12 may include an ADC 506 to convert analog signals as received from sense unit 504 into corresponding digital signals. The digital units may be stored in storage unit 508 for further post-processing by at least processor unit 512. As an example of FIG. 6 and not by way of limitation, storage unit 508 may store digital form of actual-measured signal S+N1 as measured from sense unit 504 at time instance $t_{00}$ and store digital form of actual-measured signal –S+N2 as measured from sense unit 504 at time instance $t_{10}$ for further processing by processor unit 512. Although this disclosure describes and illustrates particular components for storing signals as acquired from particular touch sensor in digital domain, this disclosure contemplates any combination of one or more suitable components for storing signals as acquired from the touch sensor in any suitable manner. As an example and not by way of limitation, the signals as acquired from touch sensor 10 may be stored in internal capacitors residing within touch-sensor controller 12.

In particular embodiments, processor unit 512 may include logic to perform dual-measurement. As an example of dual-measurement in the digital domain and not by way of limitation, processor unit 512 may configure sense unit 504 to acquire signals from Y lines 512 of touch sensor 10 at a first time instance and at a second time instance that immediately succeeds the first time instance. Second time instance may be substantially closed to time instance such that overall acquisition frequency of sense unit 504 may be substantially much higher than the frequency of any third-party sinusoid electrical signal as described above. In addition, processor unit 512 may configure sense unit 504 to reverse the polarity of the acquired signal at second time instance, as described above. Next, processor unit 512 may retrieve both normal (a.k.a. acquired signal at first time instance) measured signal and inverted (a.k.a. acquired signal at second time instance whose polarity has been reversed) measured signal from storage unit 508 and apply one or more post-processing algorithms to both signals. As an example of a post-processing algorithm and not by way of limitation, processor unit 512 may digitally add both normal and inverted measured signals. As another example of a post-processing algorithm and not by way of limitation, processor unit 512 may digitally subtract the inverted measured signal from the normal measured signal. Although this disclosure describes and illustrates particular components of particular touch-sensor controller for performing dual-measurement in particular manner, this disclosure contemplates any combination of one or more suitable components of any suitable touch-sensor controller for performing dual-measurement in any suitable manner. As an example and not by way of limitation, dual-measurement may be performed in the analog domain. Accordingly, sense unit 504 may include one or more integrator circuits for acquiring signals from touch sensor 10. In addition, sense unit 504 may reverse the polarity of signal as acquired during second time instance by reversing the polarity of the integrator circuit associated with the acquisition of the signal. Furthermore, the post-processing algorithms as described earlier may be performed by utilizing one or more integrator circuits and changing the polarity of one or more suitable integrator circuits. As an alternate means for reversing polarity of acquired signals in the analog domain, sense unit 504 may measure sense signals in response to positive and negative edges of drive signals as applied by drive unit 502 to one or more corresponding X lines 514 of touch sensor 10.

In particular embodiments, processor unit 512 may include logic to perform single-measurement. As an example of single-measurement in the digital domain and not by way of limitation, processor unit 512 may configure sense unit 504 to acquire signals from Y lines 512 of touch sensor 10 at first time instance and at second time instance. In contrast to dual-measurement, polarity of the acquired signal at second time instance may not be reversed by processor unit 512. Next, processor unit 512 may retrieve both measured signals as acquired from storage unit 508 and apply one or more post-processing algorithms to both signals. As an example of a post-processing algorithm and not by way of limitation, processor unit 512 may digitally apply one or more Fourier synthesis to at least both measured signals to detect and retrieve any suitable data as embedded within the measured signals. Although this disclosure describes and illustrates particular components of particular touch-sensor controller for performing single-measurement in particular manner, this disclosure contemplates any combination of one or more suitable components of any suitable touch-sensor controller for performing single-measurement in any suitable manner.

Figure 6:
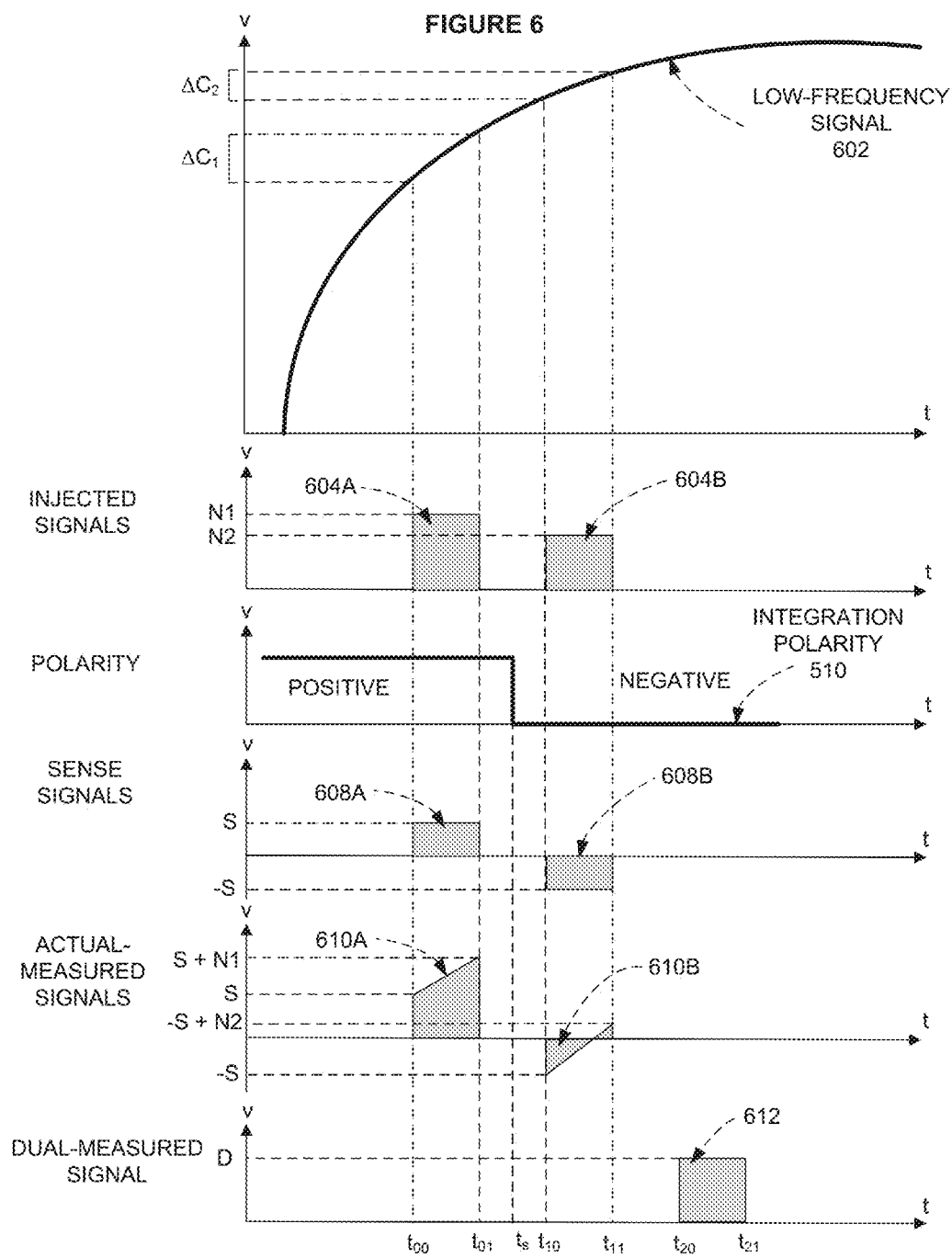
FIG. 6 illustrates example signals of touch-sensor controller of FIG. 5 during an example dual-measurement cycle.

FIG. 6 (not necessarily shown to scale) illustrates example ideal signals of touch-sensor controller 12 of FIG. 5 during an example dual-measurement cycle. As an example of FIG. 6 and not by way of limitation, low-frequency signal 602 may be injected by active stylus 200 into touch sensor 10. In particular embodiments, low-frequency signal 602 may be a third-party sinusoid electrical signal of high-voltage and low-frequency as described above. At time instance $t_{00}$, sense unit 504 may be configured by processor unit 512 to acquire from one of Y lines 512 sense signal 608A of magnitude S as illustrated by graph sense signals of FIG. 6. As an example of mutual-capacitance implementation and not by way of limitation, sense signal 608A may be produced at least in part by drive signal being applied by drive unit 502 to one or more corresponding X lines 514 of touch sensor 10. During the period of acquisition (for example, period $t_{00}$-$t_{01}$ as illustrated in FIG. 6), signal 602 changes. As an example of FIG. 6 and not by way of limitation, a magnitude delta of $\Delta C_1$ with low-frequency signal 602 may produce injected signal 604A of magnitude N1 that is acquired by sense unit 504 during acquisition period $t_{00}$-$t_{01}$. As such, an actual-measured signal 610A of magnitude S+N1 may be measured by sense unit 504 at time instance $t_{01}$. In particular embodiments, the acquisition period $t_{00}$-$t_{01}$ may be substantially smaller than the reciprocal of the acquisition frequency of touch sensor 10. As an example and not by way of limitation, the acquisition period $t_{00}$-$t_{01}$ may substantially be between 0.5 µs and 3.0 µs. Similarly at time instance $t_{10}$, sense unit 504 may be configured by processor unit 512 to acquire sense signal from the same sense electrode line as with earlier acquisition) of touch sensor 10. In particular embodiments, time instances $t_{00}$ and $t_{10}$ may be determined at least by a frequency (a.k.a. acquisition frequency) by which sense signal are being acquired from touch sensor 10 by sense unit 504. As an example and not by way of limitation, the time difference between time instances $t_{00}$ and $t_{10}$ may substantially be between 1.5 µs and 8.0 µs. In addition, sense unit 504 may be configured by processor unit 512 via integration polarity 510 to reverse polarity of the acquired sense signal. As an example of graph polarity in FIG. 6 and not by way of limitation, integration polarity 510 may reverse from positive to negative between time instances $t_{01}$ and $t_{10}$ (such as for example at time instance $t_8$) as an indication to sense unit 504 to reverse polarity of sense signal as acquired at time instance $t_{10}$. As such, sense unit 504 acquires sense signal 608B of magnitude −S at time instance $t_{10}$. As with earlier acquisition, during the latest period of acquisition (for example, period $t_{10}$-$t_{11}$ as illustrated in FIG. 6) signal 602 changes. As an example of FIG. 6 and not by way of limitation, a magnitude delta of $\Delta C_2$ with low-frequency signal 602 may produce injected signal 604B of magnitude N2 that is acquired by sense unit 504 during acquisition period $t_{10}$-$t_{11}$. As such, an actual-measured signal 610B of magnitude −S+N2 may be measured by sense unit 504 at time instance $t_{11}$. Similarly, acquisition period $t_{10}$-$t_{11}$ may be substantially smaller than the reciprocal of the acquisition frequency of touch sensor 10. As with acquisition period $t_{00}$-$t_{01}$, the acquisition period $t_{10}$-$t_{11}$ may substantially be between 0.5 µs and 3.0 µs. In particular embodiments, the difference in magnitudes N1 and N2 may depend at least on the frequency by which signals are acquired from touch sensor 10 by sense unit 504. As an example of FIG. 6 and not by way of limitation, as the acquisition frequency of sense unit 504 increases, the difference in time between time instance $t_{00}$ and $t_{10}$ reduces. When acquisitions of actual-measured signals 610A-B by sense unit 504 at time instances $t_{00}$ and $t_{10}$ are configured to be closed to each other, corresponding $\Delta C_1$ and $\Delta C_2$ of low-frequency signal 602 may be substantially similar. Accordingly, magnitude N1 may be substantially similar to magnitude N2. In contrast, when acquisitions of actual-measured signals 610A-B by sense unit 504 at time instances $t_{00}$ and $t_{10}$ are configured to be further apart, corresponding $\Delta C_1$ and $\Delta C_2$ by low-frequency signal 602 may be substantially different. Accordingly, magnitude N2 may be substantially different from magnitude N1. In other particular embodiments, both magnitudes N1 and N2 may have the same polarity. When acquisition frequency of sense unit 504 is substantially higher than that of low-frequency signal 602, polarities of both $\Delta C_1$ and $\Delta C_2$ may be the same. Accordingly, both magnitudes N1 and N2 may have the same polarity. Although the disclosure describes and illustrates particular injected signals 604A-B as produced by low-frequency signal 602, the disclosure contemplates any suitable injected signals as produced by any suitable low-frequency signal. Moreover, although this disclosure describes and illustrates particular sense signals 608A-B as acquired by sense unit 504, the disclosure contemplates any suitable sense signals as acquired by any suitable sense unit.

As an example of FIGS. 5-6 and not by way of limitation, processor unit 512 may include logic to retrieve actual-measured signals 610A-B from storage unit 508 and apply one or more post-processing algorithms to both signals to produce dual-measured signal 612 of magnitude D at time instance $t_{20}$. As an example of a post-processing algorithm and not by way of limitation, processor unit 512 may digitally add both actual-measured signals 610A-B to generate dual-measured signal 612 of magnitude (for example, D of FIG. 6) N1+N2 at time instance $t_{20}$. As such, adding both actual-measured signals as described above may suppress any sense signals 608A-B. Given that sense signals 608A-B may be utilized by touch-sensor controller 12 to detect and measure one or more touch events that are associated with proximity of any object to touch sensor 10, adding both actual-measured signals as described may be used to suppress the touch events. As another example of post-processing algorithm and not by way of limitation, processor unit 512 may digitally subtract actual-measured signal 610B from actual-measured signal 610A to generate dual-measured signal 612 of magnitude (for example, D of FIG. 6) 2S+N1−N2. If magnitudes N1 and N2 are substantially similar, D may substantially approximate 2S. As such, subtracting actual-measured signal 610B from actual-measured signal 610A suppresses the effect of low-frequency signal 602 on touch sensor 10 and doubles sense signal 608A/B. This may make touch-sensor controller 12 more sensitive to sense signals as generated by Y lines 512. Although this disclosure describes and illustrates particular components of particular touch-sensor controller for performing dual-measurement in a particular sequence at particular time instances, the disclosure contemplates any suitable combination of one or more suitable components of any suitable touch-sensor controller performing dual-measurement in any suitable order and at any suitable time instances. Furthermore, although this disclosure describes and illustrates particular waveforms and signals for dual-measurement by particular touch-sensor controller in particular order and in particular manner, this disclosure contemplates any suitable combination of one or more of a suitable waveform and one or more of a suitable signal for dual-measurement by any suitable touch-sensor controller in any suitable order and in any suitable manner.

Figure 7:
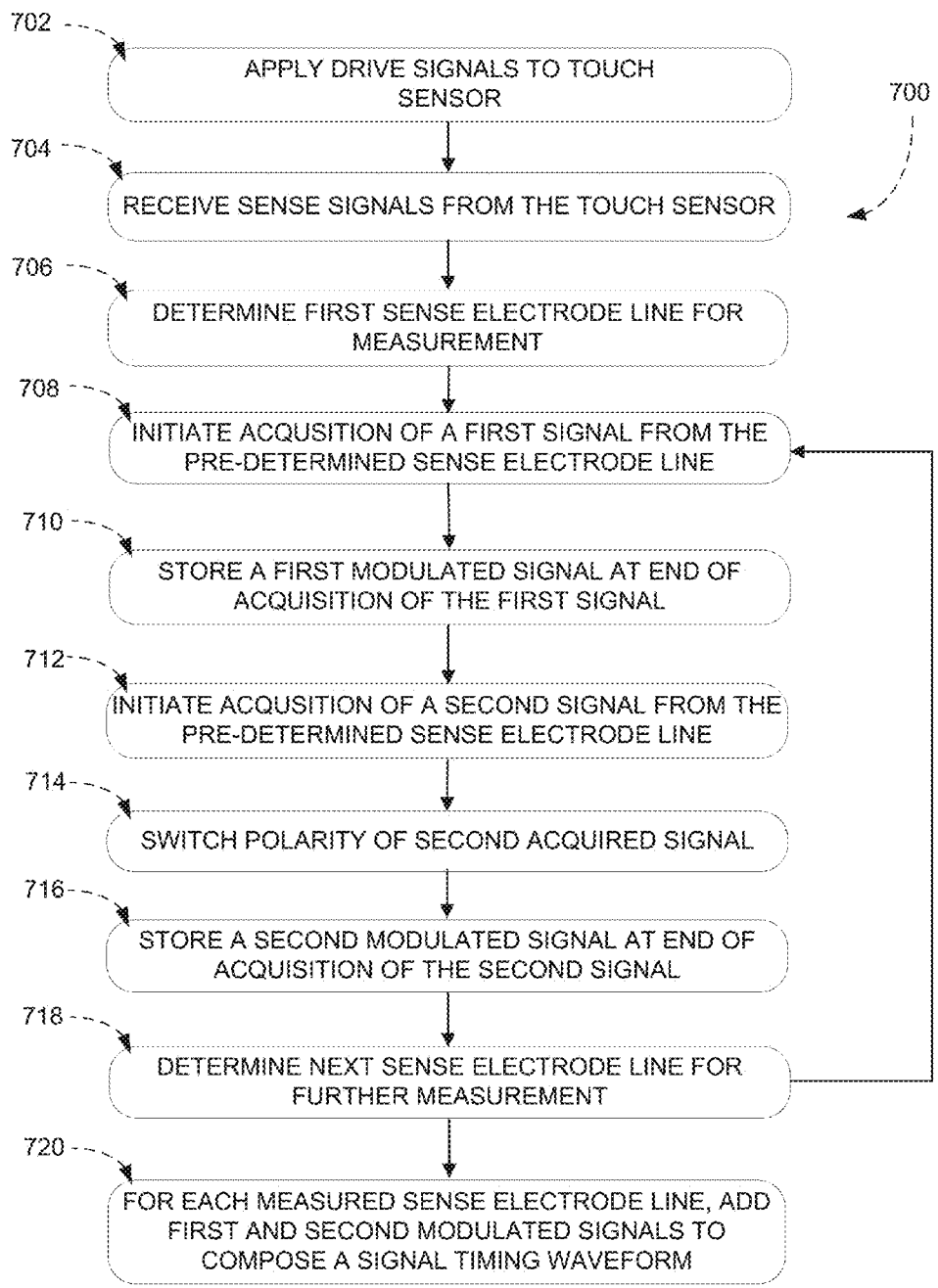
FIG. 7 illustrates an example method for mutual-capacitance dual-measurement by touch-sensor controller of FIG. 5.

FIG. 7 illustrates example method 700 for mutual-capacitance dual-measurement by touch-sensor controller 12. Method 700 may start at step 702, where drive signals are applied to touch sensor 10 associated with touch-sensor controller 12 of FIG. 5. In particular embodiments, one or more drive signals may be applied to one or more drive electrode lines of X lines 514 in touch sensor 10. As an example of FIG. 5 and not by way of limitation, one or more drive signals may be applied to each drive electrode line of X lines 514 in particular sequence and at particular time instances. Each electrode of the drive electrode line may be configured by the drive signals to generate electric field that projects upwards and outwards from the electrode. Accordingly the generated field may reach one or more neighboring sense electrode lines of Y lines 512. At step 704, sense signals are received from touch sensor 10. In particular embodiments, one or more sense signals may be received from each sense electrode line of Y lines 512. The sense signals may be produced in part by the electric field. Furthermore, the sense signals may indicate whether at least one object has come within proximity of touch sensor 10.

At step 706, a first sense electrode line of Y lines 512 may be pre-determined for measurement. As an example and not by way of limitation, the first sense electrode line may be determined such that any signals as generated from the first sense electrode line may be used to reliably detect whether an associated active stylus 200 of FIGS. 2-3 (within proximity of touch sensor 10) is activated. The associated active stylus 200 may include one or more buttons 206 as described above and illustrated by FIG. 2. When one of buttons 206 is pressed (a.k.a. active stylus 200 is activated), active stylus 200 may inject a third-party sinusoid electrical signal via tip 220 to touch sensor 10 as described above. As an example and not by way of limitation, the third-party sinusoid electrical signal may be low-frequency signal 602 of FIG. 6. As another example and not by way of limitation, the third-party sinusoid electrical signal may be any suitable high-voltage and low-frequency sinusoid electrical signal as described above. Accordingly, the location of the first electrode line may be optimal for receiving low-frequency signal 602 (or any other suitable high-voltage and low-frequency sinusoid signal) injected from active stylus 200. Although this disclosure describes and illustrates determination of particular sense electrode line of particular touch sensor for dual-measurement in a particular manner, the disclosure contemplates determination of any suitable sense electrode line of any suitable touch sensor for dual-measurement in any suitable manner. Moreover, although this disclosure describes a third-party signal as particular sinusoid signal, the disclosure contemplates the third-party signal as any suitable smooth wave. As an example and not by way of limitation, the third-party signal may be any smooth wave whose instantaneous rate of change of voltage over time is substantially within suitable limits.

At step 708, an acquisition of a first signal from the pre-determined sense electrode line is initiated. As an example of FIGS. 5-6 and not by way of limitation, the first signal may be sense signal 608A as acquired by sense unit 504 at time instance $t_{00}$. At step 710, a first modulated signal is stored at end of the acquisition of the first signal. The first modulated signal may include the first acquired signal that has been further modulated by one or more third-party sinusoid electrical signals during the acquisition of the first signal. Each of the third-party sinusoid electrical signals may be injected into touch sensor 10 and may operate at distinct frequency. As an example of FIG. 6 and not by way of limitation, the first modulated signal may be actual-measured signal 610A which includes sense signal 608A of magnitude S that is further modulated by injected signal 604A of magnitude N1 as described above. As another example of FIG. 6, the first modulated signal may be stored at time instance $t_{01}$. At step 712, an acquisition of a second signal from the pre-determined sense electrode line is initiated. As an example of FIG. 6 and not by way of limitation, the acquisition of the second signal may take place at time instance $t_{10}$. At step 714, polarity of second acquired signal is reversed. In particular embodiments, polarity of second acquired signal may be reversed by sense unit 504 as described above. As an example of FIG. 6 and not by way of limitation, the second acquired signal as reversed may form sense signal 608B of magnitude −S. At step 716, a second modulated signal is stored at end of the acquisition of the second signal. In particular embodiments, the second modulated signal may include the second signal as acquired and whose polarity has been reversed. As with the first modulated signal of step 710, the second acquired signal may be further modulated by the one or more third-party sinusoid electrical signals during the acquisition of the second signal as described above. As an example of FIG. 6 and not by way of limitation, the second modulated signal may be actual-measured signal 610B of magnitude −S+N2 as a result of sense signal 608B being modulated by injected signal 604B during the acquisition of sense signal 608B. As another example of FIG. 6 and not by way of limitation, the second modulated signal may be stored at time instance $t_{11}$.

At step 718, the next sense electrode line for further measurement may be determined. In particular embodiments, method 700 may be used to detect and measure one or more objects within proximity of touch sensor 10. As an example of FIG. 6 and not by way of limitation, sense signal 608 may be doubled and injected signal 604 may be suppressed to allow for proximity measurement of the one or more objects. As such, the next sense electrode line of Y lines 512 to be measured may be a neighboring sense electrode line such that steps 708-718 may be repeated until signal from every sense electrode line of touch sensor 10 is being considered in order to determine approximate locations of the objects. In particular embodiments, method 700 may be used to detect any third-party sinusoid electrical signal (for example, low-frequency signal 602) from associated active stylus 200 of FIGS. 2-3. As an example of FIG. 6 and not by way of limitation, sense signals 608A-B may be suppressed and injected signals 604A-B may be revealed allowing touch-sensor controller 12 to detect and measure the third-party sinusoid electrical signal as described above. Accordingly, a single sense electrode line of touch sensor 10 may be sufficient to be measured for obtaining information regarding the one or more third-party sinusoid electrical signals.

At step 720, for each measured sense electrode line, add first and second modulated signals to compose a signal timing waveform. As an example of FIG. 6 and not by way of limitation, adding actual-measured signal 610A (a.k.a. first modulated signal) and actual-measured signal 610B (a.k.a. second modulated signal) may produce dual-measured signal 612 of magnitude N1+N2 at time instance $t_{20}$. Method 700 may be repeated for multiple cycles to yield a signal timing waveform for each sense electrode line of Y lines 512. As an example and not by way of limitation, magnitude of dual-measured signal 612 may be stored in an array for each repeated cycle. Accordingly, the array of dual-measured signal 612 magnitudes may compose the signal timing waveform as described above. In particular embodiments, each signal timing waveform may be synthesized to produce one or more child timing patterns where each child timing pattern operates at a distinct frequency. The child timing patterns (individually or in combination) may be further post-processed to yield one or more embedded data. As an example of FIG. 2 and not by way of limitation, a child timing pattern of particular operating frequency produced by low-frequency signal 602 that is injected from active stylus 200 and received by touch sensor 10 may indicate a particular button of buttons 206 (of active stylus 200) being pressed. As another example of FIG. 2 and not by way of limitation, multiple child timing patterns may be produced by multiple low-frequency signals that are injected from active stylus 200 and received by touch sensor 10. Each low-frequency signal may be triggered by pressing a distinct button. By measuring a particular child timing pattern corresponding to a specific low-frequency signal, it may be possible to detect which button is pressed. As yet another example and not by way of limitation, frequency of low-frequency signal 602 may be further modulated. Such further modulation may produce a corresponding change in the associated child timing pattern which may be used to transmit information (for example, pressure information of tip 220) to touch-sensor controller 12. Although this disclosure describes and illustrates particular steps of method 700 of FIG. 7 as occurring in a particular order, this disclosure contemplates any suitable steps including, but not limited to steps of method 700 of FIG. 7 occurring in any suitable order. As an example and not by way of limitation, step 720 may be initiated after one or more objects are detected to be within proximity of touch sensor 10 (a.k.a. touch events). As described above, to detect presence of the objects within proximity of touch sensor 10, injected signal 604 may be suppressed and sense signal 608 may be doubled for further post-processing. As another example and not by way of limitation, step 720 may even be modified to measure only those sense electrode lines that are associated with the touch events. Moreover, although this disclosure describes and illustrates particular steps of method 700 for measuring injected signal 604 in particular manner, the disclosure contemplates any suitable combination of one or more suitable steps (including, but not limited to steps of method 700) for measuring injected signal 604 in any suitable manner. As an example and not by way of limitation, steps 702, 704, and 714 may be skipped in the absence of sense signals (for example, sense signals 608) from touch sensor 10. As another example and not by way of limitation, steps 702, 704, 712-716, and 720 may be skipped in the absence of sense signals (for example, sense signals 608) from touch sensor 10. By skipping such steps, touch-sensor controller 12 may directly perform sequential measurements of injected signal from each sense electrode line.

Although this disclosure describes and illustrates particular steps of method 700 for performing dual-measurements using mutual-capacitance, the disclosure contemplates any suitable combination of one or more suitable steps (including, but not limited to steps of method 700) for performing dual-measurements in any suitable implementation. In particular embodiments, dual-measurements may be performed using self-capacitance measurement. As an example of FIG. 7 and not by way of limitation, steps 702 and 704 may be combined to implement self-capacitance measurement. Furthermore, although this disclosure describes and illustrates particular components, devices, or systems carrying out particular steps of the method 700 of FIG. 7, this disclosure contemplates any suitable combination of any suitable components, devices, or systems carrying out any suitable steps of the method 700 of FIG. 7.

Herein, reference to a computer-readable non-transitory storage medium or media may include one or more semiconductor-based or other integrated circuits (ICs) (such, as for example, a field-programmable gate array (FPGA) or an application-specific (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
initiating an acquisition of a first signal from an electrode of a touch sensor according to an acquisition frequency of the touch sensor, wherein the first signal is driven at least in part by one or more objects within proximity of the touch sensor;
reversing, with a controller, a polarity of the first signal to produce a second signal;
storing a first modulated signal at an end of the acquisition of the first signal, wherein the first modulated signal comprises the second signal as modulated by one or more third-party signals during the acquisition of the first signal;
initiating an acquisition of a third signal from the electrode of the touch sensor, wherein:
the acquisition of the third signal precedes the acquisition of the first signal according to the acquisition frequency of the touch sensor; and
the third signal is driven at least in part by the one or more objects within proximity of the touch sensor;
storing a second modulated signal at an end of the acquisition of the third signal, wherein the second modulated signal comprises the third signal as modulated by the one or more third-party signals during the acquisition of the third signal; and
subtracting the first modulated signal from the second modulated signal to:
substantially suppress the one or more third-party signals; and
indicate whether the one or more objects have come within proximity of the touch sensor.

2. The method of claim 1, wherein each third-party signal is substantially equivalent to a sinusoid signal.

3. The method of claim 2, wherein the acquisition frequency of the touch sensor is larger than a frequency of each third-party signal.

4. The method of claim 1, further comprising:
adding the first and second modulated signals to:
substantially suppress the first and third signals; and
compose a signal timing waveform for the electrode of the touch sensor, the signal timing waveform being produced at least in part by the one or more third-party signals.

5. The method of claim 4, wherein:
adding the first and second modulated signals if and only if one or more objects are detected to be within proximity of the touch sensor.

6. The method of claim 4, wherein the one or more third-party signals are transmitted by a third-party device and received by the touch sensor, the third-party device comprising a physical controller.

7. The method of claim 6, wherein the third-party device is a stylus and the physical controller is a button.

8. The method of claim 6, further comprising:
processing the signal timing waveform to indicate whether the physical controller of the third-party device is activated.

9. A computer-readable non-transitory storage medium embodying logic that is configured when executed to:
initiate an acquisition of a first signal from an electrode of a touch sensor according to an acquisition frequency of the touch sensor, wherein the first signal is driven at least in part by one or more objects within proximity of the touch sensor;
reverse a polarity of the first signal to produce a second signal;
store a first modulated signal at an end of the acquisition of the first signal, wherein the first modulated signal comprises the second signal as modulated by one or more third-party signals during the acquisition of the first signal;
initiate an acquisition of a third signal from the electrode of the touch sensor, wherein:
the acquisition of the third signal precedes the acquisition of the first signal according to the acquisition frequency of the touch sensor; and
the third signal is driven at least in part by the one or more objects within proximity of the touch sensor;
store a second modulated signal at an end of the acquisition of the third signal, wherein the second modulated signal comprises the third signal as modulated by the one or more third-party signals during the acquisition of the third signal; and
subtract the first modulated signal from the second modulated signal to:
substantially suppress the one or more third-party signals; and
indicate whether the one or more objects have come within proximity of the touch sensor.

10. The medium of claim 9, wherein each third-party signal is substantially equivalent to a sinusoid signal.

11. The medium of claim 10, wherein the acquisition frequency of the touch sensor is larger than a frequency of each third-party signal.

12. The medium of claim 9, wherein the logic is further configured when executed to:
add the first and second modulated signals to:
substantially suppress the first and third signals; and
compose a signal timing waveform for the electrode of the touch sensor, the signal timing waveform being produced at least in part by the one or more third-party signals.

13. The medium of claim 12, wherein the one or more third-party signals are transmitted by a third-party device and received by the touch sensor, the third-party device comprising a physical controller.

14. The medium of claim 13, wherein the third-party device is a stylus and the physical controller is a button.

15. A touch sensor system comprising:
a touch sensor;
a computer-readable non-transitory storage medium coupled to the touch sensor and embodying logic that is configured when executed to:
initiate an acquisition of a first signal from an electrode of the touch sensor according to an acquisition frequency of the touch sensor, wherein the first signal is driven at least in part by one or more objects within proximity of the touch sensor;
reverse a polarity of the first signal to produce a second signal;
store a first modulated signal at an end of the acquisition of the first signal, wherein the first modulated signal comprises the second signal as modulated by one or more third-party signals during the acquisition of the first signal;
initiate an acquisition of a third signal from the electrode of the touch sensor, wherein:
the acquisition of the third signal precedes the acquisition of the first signal according to the acquisition frequency of the touch sensor; and
the third signal is driven at least in part by the one or more objects within proximity of the touch sensor;

store a second modulated signal at an end of the acquisition of the third signal, wherein the second modulated signal comprises the third signal as modulated by the one or more third-party signals during the acquisition of the third signal; and subtract the first modulated signal from the second modulated signal to:

substantially suppress the one or more third-party signals; and indicate whether the one or more objects have come within proximity of the touch sensor.

16. The touch sensor system of claim 15, further comprising an associated stylus, the associated stylus comprising:

a power source;

an oscillator, the oscillator being configured to generate a sinusoid signal, the sinusoid signal having a frequency that is lower than the acquisition frequency of the touch sensor;

a voltage converter, the voltage converter being configured to convert an output of the power source to an input power source for the oscillator;

a stylus tip, the stylus tip being configured to receive the sinusoid signal from the oscillator for transmission to the touch sensor; and a button, the button being configured to start or stop the transmission of the sinusoid signal to the touch sensor via the stylus tip.

* * * * *